(12) United States Patent
Heinle et al.

(10) Patent No.: US 7,318,510 B2
(45) Date of Patent: Jan. 15, 2008

(54) LIQUID FRICTION CLUTCH

(75) Inventors: Hans Heinle, Biessenhofen (DE);
Siegfried Leutner, Kaufbeuren (DE)

(73) Assignee: AGCO GmbH & Co, Marktoberdorf (DE)

( * ) Notice: Subject to any disclaimer, the term of this patent is extended or adjusted under 35 U.S.C. 154(b) by 0 days.

(21) Appl. No.: 09/758,538

(22) Filed: Jan. 11, 2001

(65) Prior Publication Data
US 2002/0005328 A1 Jan. 17, 2002

(30) Foreign Application Priority Data
Jan. 28, 2000 (GB) .................................. 0001892.9

(51) Int. Cl.
*F16D 31/00* (2006.01)
(52) U.S. Cl. ................ 192/58.61; 192/58.8; 192/58.66
(58) Field of Classification Search ............. 192/58.61, 192/58.682, 58.8, 58.63, 58.66, 58.5
See application file for complete search history.

(56) References Cited

U.S. PATENT DOCUMENTS

| | | | | |
|---|---|---|---|---|
| 3,908,604 | A * | 9/1975 | Vocklinghaus | 122/250 R |
| 4,305,491 | A | 12/1981 | Rohrer | |
| 4,351,425 | A * | 9/1982 | Bopp | 123/41.12 |
| 4,467,901 | A * | 8/1984 | Hattori et al. | 192/58.63 |
| 4,727,969 | A * | 3/1988 | Hayashi et al. | 192/58 B |
| 5,215,044 | A * | 6/1993 | Banzhaf et al. | 123/41.05 |
| 5,381,761 | A | 1/1995 | Tanaka | |
| 5,957,663 | A * | 9/1999 | Van Houten et al. | 417/13 |
| 6,021,747 | A * | 2/2000 | Gee et al. | 123/41.11 |
| 6,220,416 | B1 * | 4/2001 | Katoh et al. | 123/41.12 |

FOREIGN PATENT DOCUMENTS

GB 2163835 A 3/1986

* cited by examiner

*Primary Examiner*—Melody M. Burch
(74) *Attorney, Agent, or Firm*—MacMillan, Sobanski & Todd, LLC

(57) ABSTRACT

A drive for a cooling fan at motor vehicles including a main cooling circuit and at least one secondary cooling circuit using a fluid friction clutch including a control element for the drive of the cooling fan is described.

In case of a plurality of cooling circuits, such fluid friction clutches do not react as desired by actuating the cooling fan.

To prevent this disadvantage, a drive for a cooling fan being drivable by a fluid friction clutch is to be provided, in which the cooling fan starts operation as soon as there is a requirement in at least one of the cooling circuits.

For this reason, temperature sensors are allocated to selected secondary cooling circuits and further control element is allocated to the working chamber to bypass the control element, the control element freeing a further opening being located in the separating wall when predetermined temperatures and temperature ranges, respectively, are attained in at least one of the selected secondary cooling circuits, the opening not being influenced by the control element.

19 Claims, 4 Drawing Sheets

LIQUID FRICTION CLUTCH

BACKGROUND OF INVENTION

The present invention relates to a drive for cooling fans in motor vehicles. German Patent Application DE-OS 14 25 374 describes a cooling fan including a main cooling circuit including a main cooler and at least one secondary cooling circuit each including a secondary cooler, including a fluid friction clutch including a driving clutch unit being drivingly connected to a drive shaft, and a driven clutch unit in which a reservoir for a viscous fluid is located, the reservoir being limited by a disk-like separating wall and being connectable to a working chamber by an opening in the separating wall, the working chamber extending into a region between the clutch units in which torque is transmitted form the driving clutch unit to the driven clutch unit and the filling of which with viscous fluid is controlled by a control element freeing the opening in the separating wall depending on the temperature of the cooling air streaming through the main cooler being determined by a temperature sensor.

In the cooling fan described in DE-OS 14 25 374, the control element is designed as a pivotable valve disc closely fitting the separating wall at the side facing the reservoir chamber and being connected to a temperature sensor in the form of a spiral-like bimetallic strip. The temperature sensor is substantially exposed to the stream of outgoing air of the cooler being arranged in the main cooling circuit and effecting the cooling of the motor and it pivots the valve disc depending on the temperature of the stream of outgoing air in a way such that the valve is opened at or above a certain temperature, such that viscous fluid may enter the working chamber, the fluid effecting a transmission of torque from the driving to the driven clutch unit. With a liquid friction clutch controlled this way, the power of cooling fans is adaptable to the prevailing conditions of operation. Additionally, unnecessary consumption of energy by the cooling fan reducing the usable power of the motor is prevented.

This is only true in case of the stream of outgoing air being substantially homogeneous across its cross section since the fluid friction clutch only reacts to the temperature of the stream of outgoing air contacting the temperature sensor. In case the stream of outgoing air is strongly inhomogeneous across its cross section since it consists of the streams of outgoing air of coolers being strongly differently loaded by heat, it is possible that the fluid friction clutch does not react to drive the cooling fan as desired. In this way, it is possible that the stream of outgoing air of the main cooler to which the temperature sensor is subjected has a temperature which is too low during the operation of the vehicle to effect an actuation of the cooling fan, while the heated stream of outgoing air of a secondary cooler for hydraulic oil hydraulically driving a strongly loaded device does not reach the temperature sensor.

SUMMARY OF THE INVENTION

Starting from the above described prior art, it is the object of the present invention to provide a drive for a cooling fan of the kind described above being drivable by a fluid friction clutch, in which the cooling fan starts operation as soon as at least one of the cooling circuits requires this.

The object is achieved by the fact that selected secondary cooling circuits each include one allocated temperature sensor and a further control element is allocated to the working chamber to bypass the control element, the control element freeing a further opening in the separating wall when predetermined temperatures and temperature ranges, respectively, are attained, the opening not being influenced by the control element.

In this way, it has been realized to separate the cooling effect of the secondary circuits from the main circuit. Even in case of the main cooling circuit being subjected to a small amount of heat, the cooling fan starts operation as soon as the cooling fluid of only one secondary cooling circuit being strongly subjected to heat requires to be cooled.

Further advantageous details of the invention are described in the dependent claims.

BRIEF DESCRIPTION OF THE DRAWINGS

The invention is further explained with reference to drawings.

DETAILED DESCRIPTION OF THE PREFERRED EMBODIMENT

Figure 1:
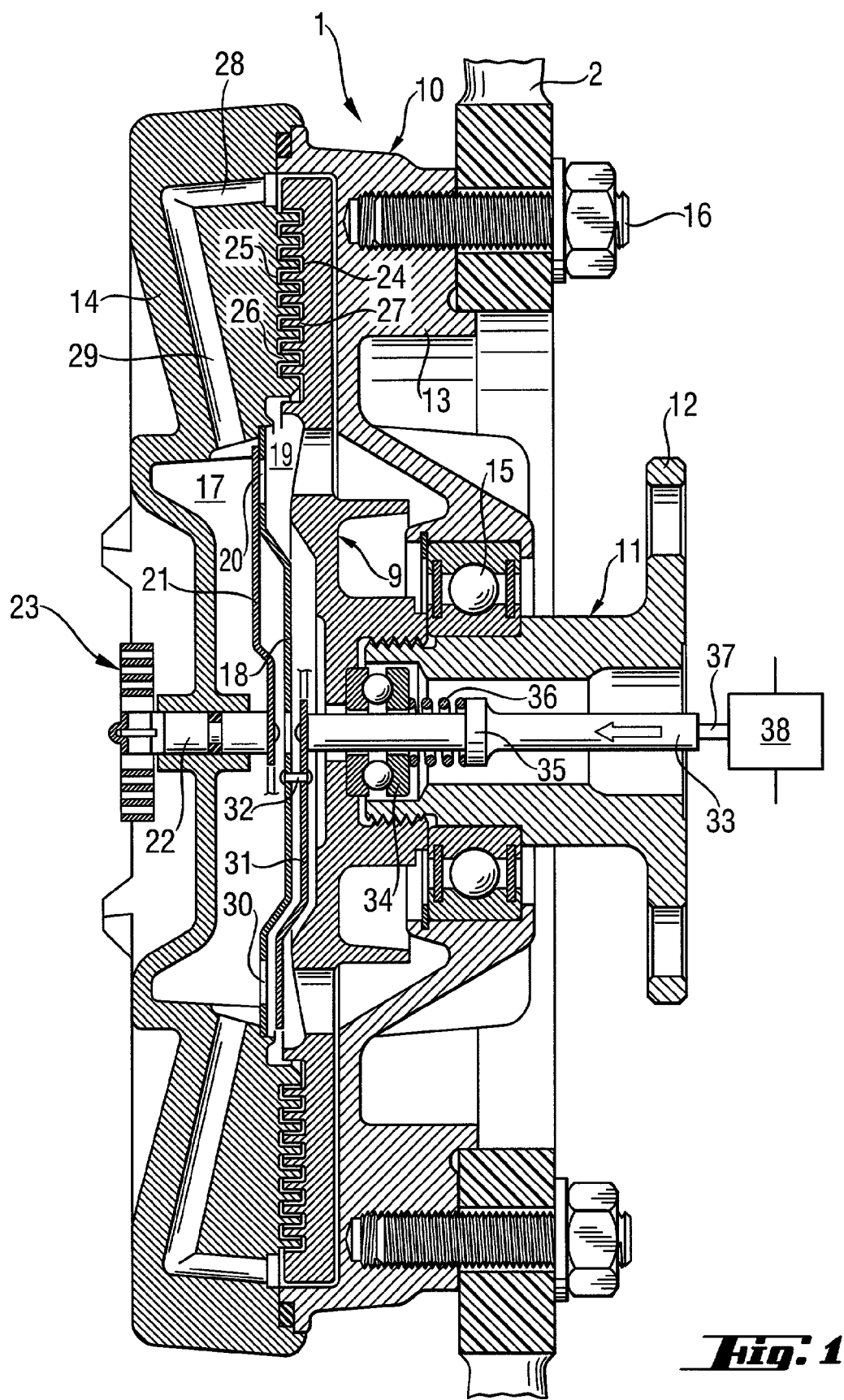
FIG. 1 illustrates a first, partially cut-away fluid friction clutch.
Figure 2:
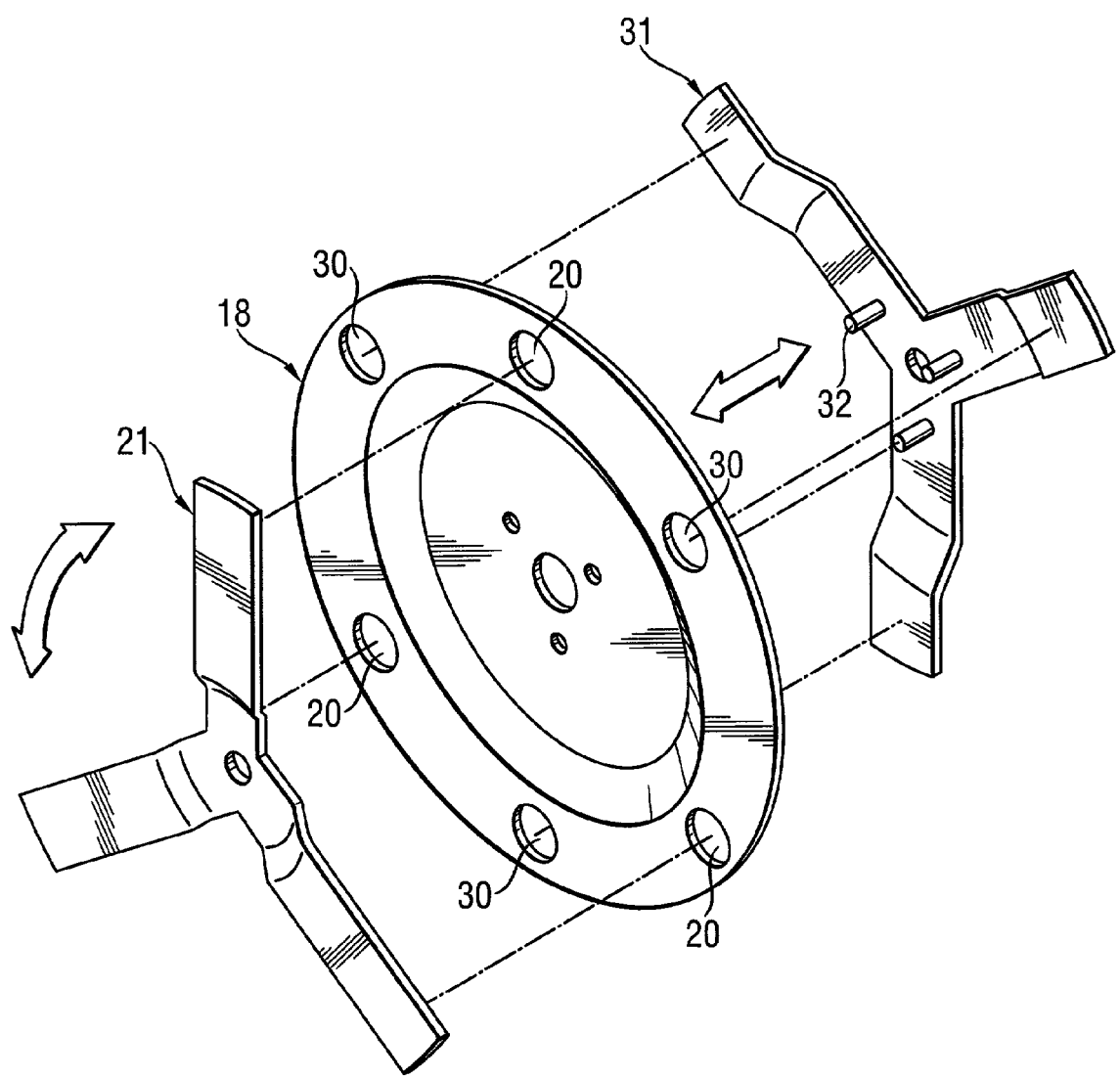
FIG. 2 illustrates an expanded representation of the separating wall and the allocated control elements of the fluid friction clutch according to FIG. 1.
Figure 3:
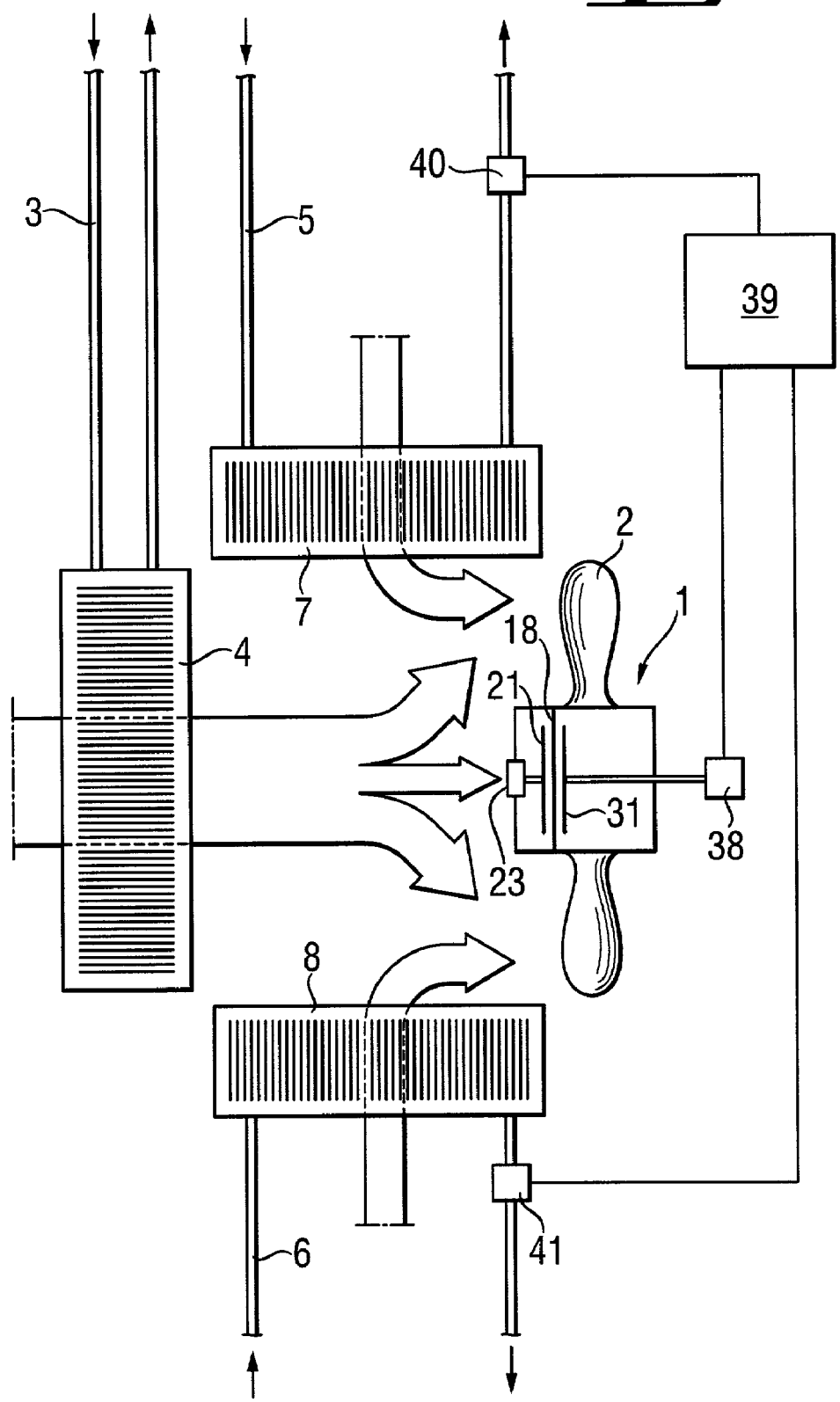
FIG. 3 illustrates a schematic view of the drive of a cooling fan.

FIG. 1 illustrates a fluid friction clutch being a first exemplary embodiment of the invention. The fluid friction clutch serves to drive the fan wheel 2 of a cooling fan for a cooling arrangement in a vehicle including an combustion engine. As illustrated in FIG. 3, the fluid friction clutch 1 is arranged behind a cooling arrangement including a main cooler 4 being located in a main cooling circuit 3 and a plurality of secondary coolers 7, 8 each being located in a secondary cooling circuit 5, 6.

The fluid friction clutch 1 includes a driving clutch unit 9 and a driven clutch unit 10. The driving clutch unit 9 is drivable by a driving shaft 11 to which the driving clutch unit 9 is fixedly connected in the end region of the clutch. The other end region of the driving shaft 11 is designed as a flange 12 being connected to a V-belt drum (not shown) being driven by a motor by screws.

The driven clutch unit 10 includes two clutch portions 13, 14 being connected by screws, the clutch portions 13, 14 encompassing a disc-like portion of the driving clutch unit 9. The clutch portion 13 is rotatably supported on the drive shaft 11 by a rolling bearing 15, and it includes a plurality of screw bolts 16 in its outer rim portion, the screw bolts 16 being spaced apart about the circumference and extending in an axial direction and serving for the attachment of the fan wheel 2.

A reservoir 17 for a viscous fluid is arranged in the clutch portion 14, the reservoir 17 being separated from the working chamber 19 by a disc-like separating wall 18. Three equally distributed openings 20 are arranged in the outer rim region of the separating wall 18. Usually, i.e. when the fan wheel 2 is not to be driven, the openings 20 are covered by a control element 21, and they are consequently closed such that no viscous fluid may enter the working chamber 19 from the reservoir 17. The control element 21 is axially fixedly connected to a sensor shaft 22 being rotatably arranged in the clutch portion 14. The sensor shaft 22 is connected to a temperature sensor 23 in the form of a bimetallic strip such that the sensor shaft 22 and the control element 21 are rotated as soon as the temperature sensor 23 is subjected to a sufficiently hot stream of air. When the sensor shaft 22 keeps on rotating, the control element 21 more and more frees the openings 20, and thus a certain amount of viscous fluid may enter the working chamber 19. From the working chamber 19, the viscous fluid is catapulted in a region between the driving clutch unit 9 and the clutch portion 14 extending from the working chamber 19 due to centrifugal forces at the permanently rotating driving clutch unit 9. Both portions 9, 14 include annular channels 24, 25 and annular protrusions 26, 27 there between in this portion. The channels 24, 25 and the protrusions 26, 27 engage one another with a little clearance, and they form a labyrinth. Due to inner friction, viscous fluid entering this region transmits torque depending on the amount of the viscous fluid to the driven clutch unit 10, and it effects a rotation of the clutch unit 10 and the fan wheel 2. Bores 28, 29 are arranged in the clutch portion 14 for a removal of the viscous fluid from the labyrinth, the fluid being guided back into the reservoir 17.

The described fluid friction clutch so far corresponds to known clutches only serving to operate with one cooling circuit, usually the main cooling circuit. In the following, arrangements serving to enlarge the field of application of such a known fluid friction clutch are described.

For this reason, the separating wall 18 includes additional openings 30 being arranged between the openings 20 cooperating with the control element 21. A further disc-like control element 31 being arranged in the working chamber 19 cooperates with these openings 30, the design of which being illustrated in FIG. 3. The control element 31 is not rotatable with respect to the separating wall 18 due to three bolts 32, and, as illustrated, it covers only the openings 30, while the openings 20 are not influenced by the control element 31. The openings 30 are closed and opened by an axial movement of the control element 31 against the separating wall 18, and away from the separating wall 18, respectively. In FIG. 1, the control element 31 is lifted from the separating wall 18, and the openings 30 are consequently free. In this case, viscous fluid falls into the working chamber 19 and actuates the cooling fan although the control element 21 closes the openings 20.

The axial displacement of the control element 31 is attained by an actuation rod 33 extending through the hollow drive shaft 11 and an axial bore in the driving clutch unit 9 and being fixedly connected with the control element 31. The actuation rod 33 is supported at the driving clutch unit 9 by an appropriate rolling bearing 34, and it is moved into the right end position illustrated in FIG. 1 in which the openings 30 are free by the force of a biased pressure spring 36 being located between the rolling bearing 34 and a protrusion 35 of the actuation rod 33.

The actuation rod 33 contacts the armature 37 of a lifting magnet 38 as control unit being fixedly connected to the vehicle in the end region protruding from the drive shaft 11. The lifting magnet 38 in its excited state pushes the actuation rod 33 in the left end position in which the openings 30 are closed. An axial bearing (not shown) is arranged between the actuation rod 33 and the armature 37 to reduce the friction between the actuation rod 33 and the armature 37.

As illustrated in FIG. 3, an electronic circuit 39 controls the lifting magnet 38. The electronic circuit 39 processes signals coming from the temperature sensors 40, 41 in the secondary cooling circuits to be watched using an OR-operation. In this embodiment, two secondary cooling circuits 5, 6 including the allocated secondary coolers 7, 8 are provided at the vehicle in addition to the main cooling circuit 3 including the main cooler 4. In case the vehicle for example is a farming tractor, the secondary cooling circuit 5 may serve to cool the oil of the transmission and the other secondary cooling circuit 6 may serve to cool hydraulic fluid. In both secondary cooling circuits 5, 6 there is the possibility of the fluid overheating when the fluid friction clutch only reacts to the temperature of the outgoing air of the main cooler 4, and when this temperature is too low to achieve an effect. Consequently, both secondary cooling circuits 5, 6 include a temperature sensor.

The signals being supplied by the temperature sensors 40, 41 in case of low temperatures prevailing in the corresponding secondary cooling circuits 5, 6 are converted into a signal in the circuit 39, the signal actuating the lifting magnet 38 and pushing the actuation rod 33 against the force of the pressure spring 36 in a left direction into the liquid friction clutch. Thus, the control element 31 is pressed against the separating wall 18, and the openings 30 are thereby closed. In case the temperature rises above a predetermined value in the secondary cooling circuits 5, 6, the circuit 39 actuates the lifting magnet 38, and the actuation rod 33 is consequently pushed in a right direction by the force of the pressure spring 36. Thus, the control element 31 moves away from the separating wall 18 freeing the openings 30 such that viscous fluid may flow into the working chamber 19 and the fan wheel 2 may start to rotate. These actions only take place in case the stream of air of the main cooler 4 is comparatively cool. When the stream of air is hot enough to make the control element 21 free the openings 20 by the temperature sensor 23, the fan wheel 2 is actuated independent from the temperatures prevailing in the secondary cooling circuits 5, 6. In this way, it is ensured that the cooling fan 2 always works in case this is necessary due to the temperatures in one or more of the cooling circuits 3, 5, 6.

Figure 4:
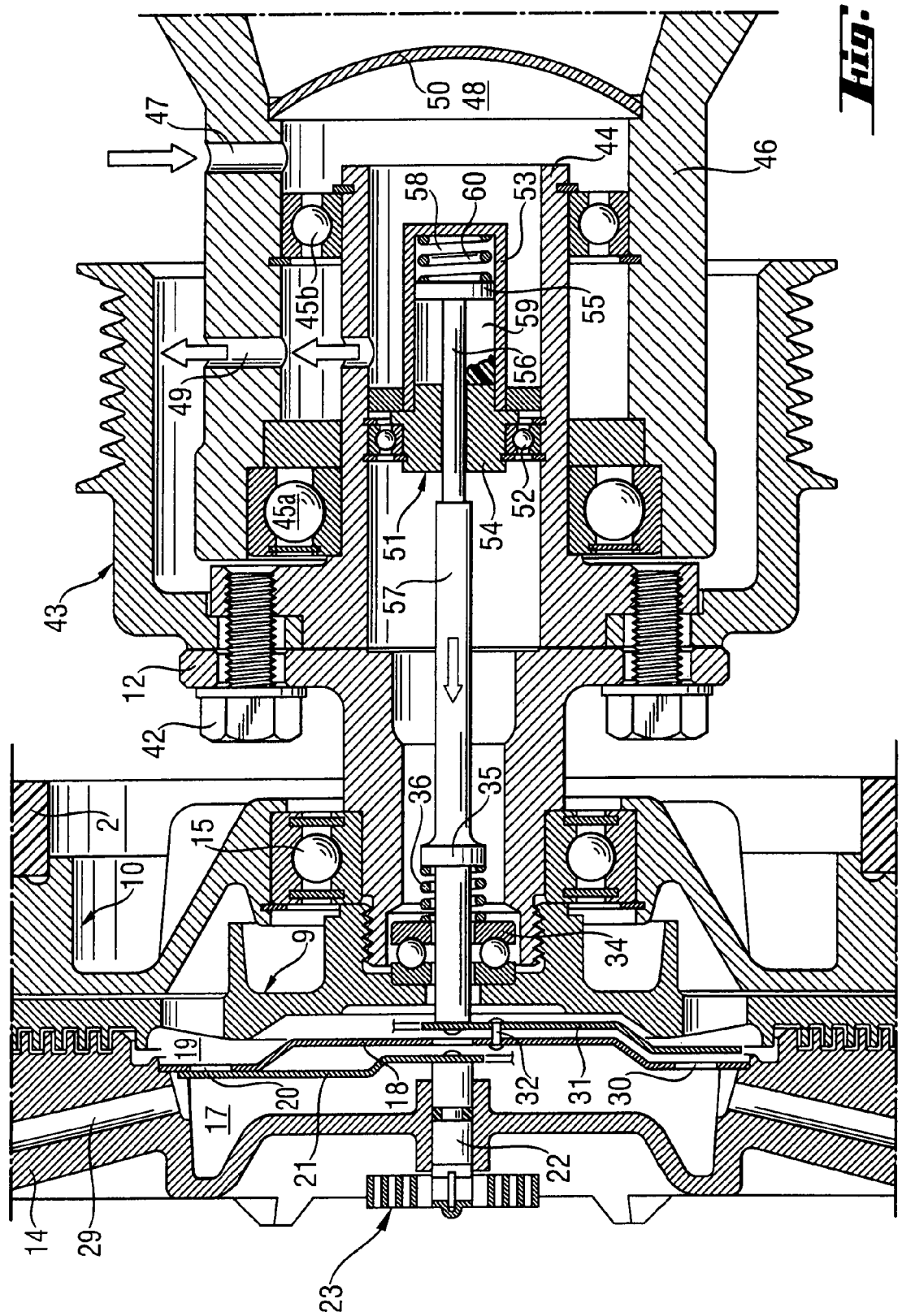
FIG. 4 illustrates a second, partially cut-away fluid friction clutch.

In the embodiment as illustrated in FIG. 4, the fluid friction clutch substantially is structurally identical to the one described with respect to FIG. 1. The control element 21 is bypassed in the same way as this is the case in the above described embodiment. There are differences to the above described embodiment with respect to the way of the actuation of the control element 31 directly by a temperature sensor of a secondary cooling circuit.

The liquid friction clutch is connected to a V-belt drum 43 by screws 42, the hollow inner shank 44 of the V-belt drum 43 being rotatably supported in a bearing housing 46 by rolling bearings 45a and 45b. The bearing housing 46 is connected to the motor (not illustrated), and it includes a bore 47 through which the cooling fluid of a secondary cooling circuit enters a chamber 48 being located in the inner shank 44. The cooling liquid exits through a further bore 49 in the inner shank 44 and the bearing housing 46. The chamber 48 is for example limited by a closing cap 50 and a control unit 51 being axially fixed but rotatably supported in the bore of the inner shank 44 by a rolling bearing 52.

The control unit 51 is designed as a control cylinder. The control cylinder includes a cylinder 53 being surrounded by cooling liquid, a closing portion 54 laterally closing the cylinder and a piston 55 being movable inside the cylinder and forming a unit with a piston rod 56 extending through the closing portion 54. The free end of the piston rod 56 is fixedly connected to an actuation rod 57 for the control element 31. The piston 55 forms two chambers 58, 59 inside the cylinder, a biased pressure spring 60 being inserted into the chamber 58 not including the piston rod and pressing the control element 31 against the separating wall 18. The chamber 59 including the piston rod is filled by wax serving as temperature sensor, the wax expanding in case of a rising temperature of the cooling fluid subjecting the cylinder 53 and displacing the piston 55 against the force of the pressure spring 60. Consequently, the control element 31 is lifted from the separating wall 18, and it frees the openings 30.

What is claimed is:

1. A drive for cooling fans in motor vehicles, the drive comprising:
    a primary cooler (4) located in a primary cooling circuit (3),
    a primary temperature sensor (23),
    at least two secondary coolers (7, 8) located in respective secondary cooling circuits (5, 6),
    a fluid friction clutch including driving and driven clutch members (9, 10), and
    a reservoir (17) for a viscous fluid, the reservoir (17) being limited by a separating member (18) and being connectable to a working chamber (19) by at least one first opening (20) in the separating member (18), the working chamber (19) extending into a region between the clutch members (9, 10) in which torque is transmitted from the driving clutch member (9) to the driven clutch member (10) by the viscous fluid, and wherein filling of the working chamber (19) with the viscous fluid is controlled by a first control element (21) opening and closing the first opening (20) in the separating member (18) depending on the temperature of cooling air passing through the primary cooler (4) sensed by the primary temperature sensor (23),
    characterized in that each of the at least two secondary cooling circuits (5, 6) includes a secondary temperature sensor (40, 41), the secondary temperature sensors (40, 41) being operatively connected to a control unit (38, 39) arranged to control a second control element (31), wherein the separating member (18) comprises at least one second opening (30), the second control element (31) being arranged in the working chamber (19), the control unit (39) moving the second control element (31) to press against the separating member against the bias of a spring member to close the at least one second opening (30) in accordance with a sensed temperature detected by one or more of the secondary temperature sensors (40, 41) and moving the second control element away from the separating member to open the at least one second opening in accordance with the sensed temperature rising above a predetermined value to control the filling of the working chamber (19) with the viscous fluid, and wherein control of the second control element (31) is independent of control of the first control element (21).

2. A drive according to claim 1 wherein the first and second control elements (21, 31) are arranged on opposite sides of the separating member (18).

3. A drive according to claim 1 wherein the second control element (31) moves axially towards and away from the separating member (18) to respectively close and open the at least one second opening (30).

4. A drive according to claim 3 wherein the degree of movement of the second control element (31) is proportional to the temperature sensed by the secondary temperature sensors (40, 41).

5. A drive according to claim 1 wherein the second control element (31) is connected to the control unit by an actuation member (33, 57).

6. A drive according to claim 5 wherein the actuation member (33, 57) extends through a concentric bore of a drive shaft (11), and the control unit engages the actuation member (33, 57) extending from the drive shaft (11).

7. A drive according to claim 1 wherein the control unit includes a magnet (38).

8. A drive according to claim 7 wherein the control unit also includes an electronic circuit, the magnet (38) being controlled by the electronic circuit (39), the secondary temperature sensors (40, 41) forming part of the electronic circuit, and wherein the magnet (38) is moved to open the at least one second opening (30) if either one of the secondary temperature sensors (40, 41) detects said sensed temperature rising above the predetermined value.

9. A drive for cooling fans in motor vehicles, the drive comprising:
    a primary cooler (4) located in a primary cooling circuit (3),
    a primary temperature sensor (23),
    a secondary cooler (7) located in a secondary cooling circuit (5),
    a fluid friction clutch including driving and driven clutch members (9, 10), and
    a reservoir (17) for a viscous fluid, the reservoir (17) being limited by a separating member (18) and being connectable to a working chamber (19) by at least one first opening (20) in the separating member (18), the working chamber (19) extending into a region between the clutch members (9, 10) in which torque is transmitted from the driving clutch member (9) to the driven clutch member (10) by the viscous fluid, and wherein filling of the working chamber (19) with the viscous fluid is controlled by a first control element (21) opening and closing the first opening (20) in the separating member (18) depending on the temperature of cooling air passing through the primary cooler (4) sensed by the primary temperature sensor (23),
    characterized in that the secondary cooling circuit (5) includes a secondary temperature sensor (40, 59), the secondary temperature sensor (40, 59) being operatively connected to a control unit (38, 39, 51) arranged to control a second control element (31), wherein the separating member (18) comprises at least one second opening (30), the second control element (31) being arranged in the working chamber (19), the control unit (38, 39, 51) moving the second control element (31) to press against the separating member against the bias of a spring member to close the at least one second opening (30) in accordance with a sensed temperature detected by the secondary temperature sensor (40, 59) and moving the second control element away from the separating member to open the at least one second opening in accordance with the sensed temperature rising above a predetermined value to control the filling of the working chamber (19) with the viscous fluid, and wherein control of the second control element (31) is independent of control of the first control element (21).

10. A drive according to claim 9 wherein the first and second control elements (21, 31) are arranged on opposite sides of the separating member (18).

11. A drive according to claim 9 wherein the second control element (31) moves axially towards and away from the separating member (18) to respectively close and open the at least one second opening (30).

12. A drive according to claim 11 wherein the degree of movement of the second control element (31) is proportional to the temperature sensed by the secondary temperature sensor (40).

13. A drive according to claim 9 wherein the second control element (31) is connected to the control unit by an actuation member (33, 57).

14. A drive according to claim 13 wherein the actuation member (33, 57) extends through a concentric bore of a driveshaft (11), and the control unit engages the actuation member (33, 57) extending from the drive shaft (11).

15. A drive according to claim 14 wherein the control unit (51) is rotatably arranged in a chamber (48) of a drum (43) driving the drive shaft (11), and a working fluid flows through the chamber (48) of the drum (43).

16. A drive according to claim 15 wherein the control unit (51) is rotatably supported in the drum (43) by a roller bearing (52).

17. A drive according to claim 13 wherein the control unit (51) includes a piston and cylinder actuator, the piston being connected to the actuation member (57), and wherein the piston includes first and second surfaces, the first surface being subjected to a force of a biasing element (60), and the second surface being subjected to a force generated by an element (59) comprising the secondary temperatures sensor which expands with rising temperatures to open the at least one second opening (30).

18. A drive according to claim 9 wherein the control unit includes a magnet (38).

19. A drive according to claim 18 wherein the control unit also includes an electronic circuit, the magnet (38) being controlled by the electronic circuit (39), the secondary temperature sensor (40) forming part of the electronic circuit, and wherein the magnet (38) is moved to open the at least one second opening (30) if either one of the secondary temperature sensor (40) detects said sensed temperature rising above the predetermined value.

* * * * *